(12) United States Patent
Parlamas et al.

(10) Patent No.: US 7,739,395 B1
(45) Date of Patent: Jun. 15, 2010

(54) CALL SIGNALING IN AN IP NETWORK

(75) Inventors: Stephanie Parlamas, Colts Neck, NJ (US); Harish Samarasinghe, Holmdel, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1524 days.

(21) Appl. No.: 10/828,950

(22) Filed: Apr. 21, 2004

Related U.S. Application Data (60) Provisional application No. 60/465,374, filed on Apr. 25, 2003.

(51) Int. Cl.
G06F 15/16 (2006.01)
(52) U.S. Cl. ......................... 709/230; 370/352
(58) Field of Classification Search .................. 709/230
See application file for complete search history.

(56) References Cited

U.S. PATENT DOCUMENTS

| | | | |
|---|---|---|---|
| 6,144,671 A | | 11/2000 | Perinpanathan et al. |
| 6,327,267 B1 * | | 12/2001 | Valentine et al. ............ 370/466 |
| 6,438,114 B1 | | 8/2002 | Womack et al. |
| 6,600,735 B1 | | 7/2003 | Iwaama et al. |
| 6,707,813 B1 | | 3/2004 | Hasan et al. |
| 6,842,449 B2 * | | 1/2005 | Hardjono ..................... 370/352 |
| 7,245,912 B1 * | | 7/2007 | Fenton et al. ............... 455/433 |
| 7,313,131 B2 * | | 12/2007 | O'Connor et al. ........... 370/352 |
| 7,406,168 B2 * | | 7/2008 | Celi et al. .............. 379/265.01 |
| 2002/0194331 A1 * | | 12/2002 | Lewis et al. .................. 709/224 |

OTHER PUBLICATIONS

Rosenberg. RFC 3261—SIP: Session Initiation Protocol. Jun. 2002.*
Sparks. RFC 3515—The Session Initiation Protocol (SIP) Refer Method. Apr. 2003.*

* cited by examiner

*Primary Examiner*—Vivek Srivastava
*Assistant Examiner*—Bryan Lee (57) ABSTRACT

A method and apparatus for call setup signaling in a VoIP network is disclosed. An application server receives call information from a network node, which causes the application server to be inserted in the call setup signaling path. The application server provides any special feature processing necessary for call setup. Upon the application server determining that it is no longer required in the signaling path for call setup, the application server removes itself from the call setup signaling path. The application server may remove itself from the signaling path prior to completion of call setup, thereby freeing up network resources and reducing post dial delay. In various embodiments, the application server removes itself from the call setup signaling path by transmitting information utilizing particular protocol messages.

15 Claims, 4 Drawing Sheets

CALL SIGNALING IN AN IP NETWORK

This application claims the benefit of U.S. Provisional Application No. 60/465,374 filed Apr. 25, 2003, which is incorporated herein by reference.

BACKGROUND OF THE INVENTION

The conventional Public Switched Telephone Network (PSTN) is a circuit switched network in which calls are assigned dedicated circuits during the duration of the call. Such networks are well known in the art, and service providers have developed various services which may be provided to subscribers via such a conventional circuit switched network.

Recently, data packet networks, such as local area networks (LAN) and wide area networks (WAN) have become more prevalent. These data packet networks operate in accordance with the internet protocol (IP) and such networks are referred to as IP networks. The popularity of IP networks has created an interest in providing voice and related services over IP networks.

Conventional PSTN voice services dedicate a circuit connection between a calling and called party, and as such, that connection is guaranteed a certain level of performance because it is not shared with any other network users. IP networks, on the other hand, are shared networks in which the network resources are shared between users. The notion of a connection in a data packet network is very different from the notion of a connection in a circuit network. In a circuit network, the connection is a dedicated circuit which is used only by the calling and called parties. As such, it is easy to guarantee a certain level of service via the circuit network. The problem with such a network is that of efficiency. That is, the dedication of a circuit between all calling and called parties may be inefficient because such dedicated circuits provide more bandwidth than is necessary. In a data network, the connection between two parties is not dedicated, and traffic between the parties is transmitted via the data packet network along with the data packets of other users. There is no dedicated path between the parties, and data packets may be transmitted between the parties via different paths, depending upon network traffic.

In the PSTN, call setup is controlled by a signaling network in accordance with the well known Signaling System No. 7 (SS7). An SS7 network exists within the PSTN network and controls call setup by conveying labeled messages via signaling channels which are separate from the voice channels. The details of an SS7 network is well known and the details will not be described in further detail herein.

Signaling in a voice over IP (VoIP) network is accomplished by sending messages utilizing the Session Initiation Protocol (SIP) which will be described in further detail below. In contrast to the SS7 network utilized in the conventional PSTN network, SIP messages in a VoIP network are not transmitted via a dedicated signaling network, but are transmitted like any other data packets.

One of the goals of a voice network is to minimize post dial delay (PDD) which is the time required to connect the call after the user finishes dialing the called number. One of the factors that determines the PDD is the extent of signaling required to set up the call. Thus, a reduction in the required signaling will decrease the PDD and therefore increase customer satisfaction. Another goal of a voice network is to decrease the load on the various network elements. Once again, a reduction in the required signaling also reduces the load on the network signaling elements.

Therefore, what is needed is a method and apparatus for reducing the required signaling in a VoIP network.

BRIEF SUMMARY OF THE INVENTION

The present invention improves call setup signaling in an internet protocol network. In accordance with the invention, a network node removes itself from the call setup signaling path upon a determination that the network node is no longer needed in the signaling path in order to successfully complete the call setup. Since this removal may occur prior to completion of call setup, the removal of the network node frees up network resources, speeds up call setup, and reduces PDD.

In one embodiment, the network node is an application server which provides call feature processing during call setup. The application server receives call information during call setup and is thereby inserted into the signaling path. The application server then determines whether it is required in the signaling path in order to complete the call setup. If the application server is not required in the signaling path to complete the call setup, the application server removes itself from the signaling path. In various embodiments, the application server removes itself from the signaling path by transmitting particular signaling protocol messages as will be described in further detail below. If the application server is required in the signaling path to complete call setup, then the application server provides the required feature processing. Thereafter, the application server determines that it is no longer required in the signaling path and removes itself from the signaling path. Again, this removal may take place prior to completion of call setup, thereby freeing up network resources, speeding up call setup, and reducing PDD.

The principles of the present invention may be implemented in various call setup scenarios. For example, the principles of the invention are useful when the services of a media server are necessary for playing announcements and collecting user input during call setup. In such an embodiment, the application server which invokes the media server and validates the user input only remains in the call setup signaling path as long as necessary to validate the user input, and thereafter removes itself from the signaling path when it is no longer required in the signaling path to complete the call setup.

The principles of the present invention are also useful in an embodiment in which the application server is used to provide primary and alternate call routing numbers. In such an embodiment, the application server may remove itself from the signaling path after providing the alternate routing number.

As will be appreciated from the following detailed description, there are many call setup scenarios, in addition to those described herein, in which the principles of the present invention would be advantageous.

These and other advantages of the invention will be apparent to those of ordinary skill in the art by reference to the following detailed description and the accompanying drawings.

DETAILED DESCRIPTION

Figure 1:
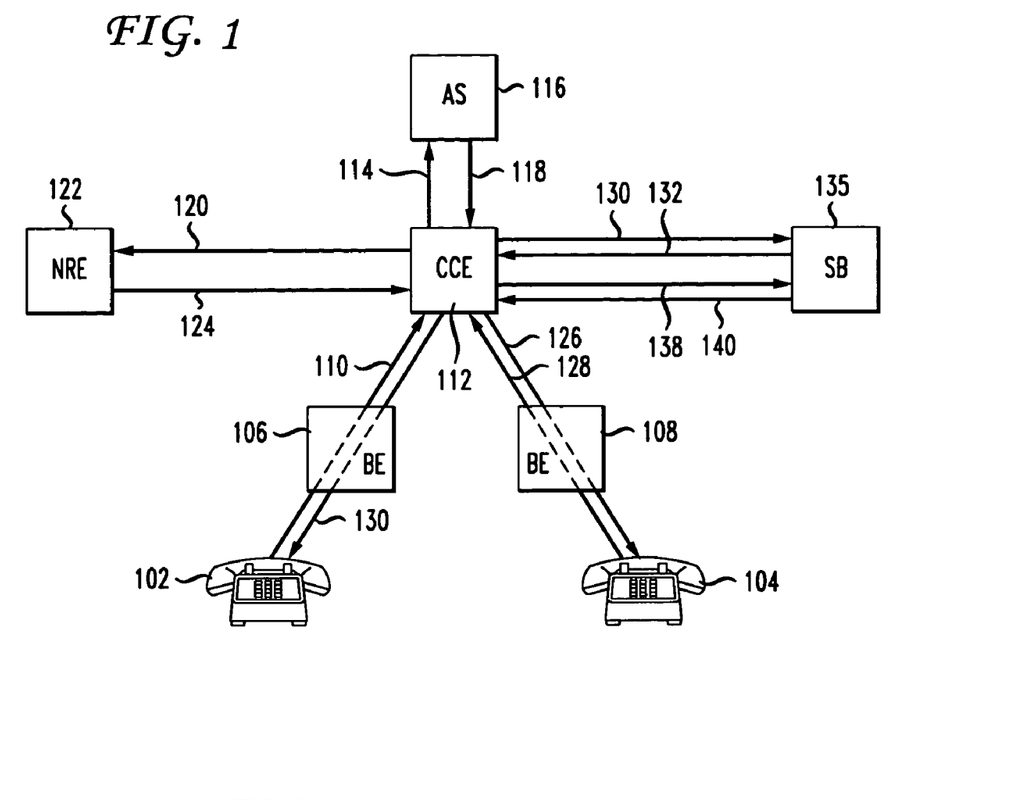
FIG. 1 shows an IP network illustrating an embodiment of the present invention.

FIG. 1 shows an IP network in which one embodiment of the present invention may be implemented. The network utilizes the Session Initiation Protocol (SIP) in order to set up connections (e.g., VoIP calls) between users. SIP is a well known application-layer control protocol used to establish, modify and terminate sessions such as IP telephony calls. SIP is described in detail in Internet Engineering Task Force (IETF) Request for Comments (RFC) 3261; SIP: Session Initiation Protocol; J. Rosenberg, H. Schulzrinne, G. Camarillo, A. Johnston, J. Peterson, R. Sparks, M. Handley, E. Schooler; June 2002, which is incorporated by reference herein. The details of SIP will not be described herein, as the protocol is well known to those skilled in the art. The protocol will be described only insofar as necessary for an understanding of the present invention.

With reference to FIG. 1, it is to be understood that the network elements shown in FIG. 1 are logical entities. Such logical entities may be implemented in various hardware configurations. For example, these network elements may be implemented using programmable computers which are well known in the art. Such programmable computers would have the required network interfaces to allow for network communication, as well as appropriate software for defining the functioning of the network elements. Such software is executed on one or more computer processors which control the overall operation of the network elements via execution of such software. The detailed hardware and software configuration of the network elements will not be described in detail herein. One skilled in the art of data networking and computers could readily implement such network elements given the description herein. As used herein, a network element refers to a logical entity which performs a network function. A network node refers to the computing platform on which a network element is implemented.

Referring now to FIG. 1, assume that IP enabled telephone 102 wishes to initiate an IP telephony call to IP enabled telephone 104. In FIG. 1, telephone 102 is connected to a border element (BE) 106 which provides telephone 102 access to the IP network. Similarly, telephone 104 is connected to BE 108 which provides telephone 104 access to the IP network. In the example of FIG. 1, the transaction begins by telephone 102 sending an INVITE request 110 addressed to telephone 104's Uniform Resource Identifier (URI) which identifies telephone 104. The INVITE request contains a number of header fields which are named attributes that provide additional information about a message. The details of an INVITE are well known and will not be described in detail at this point.

The INVITE message 110 is received at the call control element (CCE) 112. The CCE 112 performs the functions of interfacing with other network elements such as Border Elements (BE), Service Brokers (SB), Application Servers (AS), Media Servers (MS), Network Routing Engines (NRE), and others, to provide the necessary functions to process a call request. The CCE 112 determines whether special feature processing is required by the call by sending an INVITE message 130 to service broker (SB) 135. Examples of special processing are 8YY (e.g., 800) calls or Software Defined Network (SDN) calls. The SB 135 determines whether special processing is required based on call information it receives in the INVITE message 130. It is noted that while the SB function is a separate logical function from the CCE, the SB function may be contained in the CCE network element or a standalone network element. If special feature processing is required, the SB 135 determines the appropriate application server to provide the special feature processing for the call. The SB 135 sends a REDIRECT message 132 to the CCE 112 indicating the IP address of the appropriate application server to provide the feature processing. The CCE 112 sends a query (an SIP INVITE) 114 to the application server identified by the SB 135, for example AS 116. At this point, the AS 116 has been inserted into the signaling path for the call setup signaling being described herein.

Figure 2:
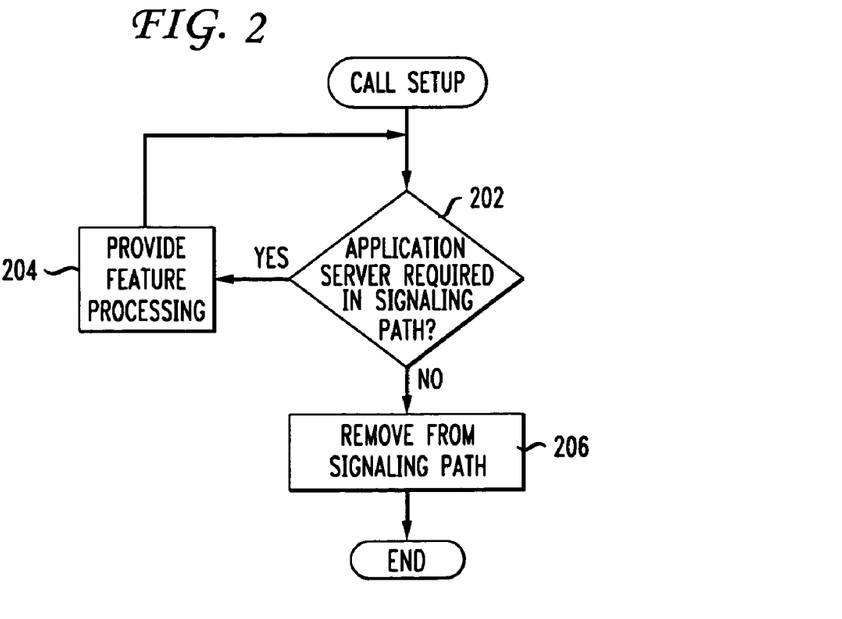
FIG. 2 is a flowchart showing the steps performed by an application server in accordance with one embodiment of the invention.

The AS 116 contains the intelligence for offering intelligent network services such as local, toll-free, virtual private networks, and various multimedia features such as email and click-to-dial. In accordance with one embodiment of the invention, upon the AS 116 being inserted into the signaling path for the call setup, the AS 116 performs the steps shown in FIG. 2. First, the AS 116 determines in step 202 whether it is required in the signal path for call setup. At this point in the example, the AS 116 is required in the signaling path because the CCE 112 requires the routing number for the call. Therefore, control passes to step 204 in which the AS 116 executes service logic (e.g., computer program code) and performs the required feature processing. For the present example, assume that the only feature processing required is that the AS 116 provide a routing number for the call. The processing loop (i.e., steps 202 and 204) shown in FIG. 2 represents that the AS 116 will continually determine whether it is still required in the signaling path. When the AS 116 determines that it is no longer required in the signaling path, then in step 206 the AS 116 removes itself from the signaling path.

In the example being described herein, after determining the routing number, the AS 116 will determine in step 202 that it is no longer required in the signaling path. Thus, in the particular embodiment being described, the AS 116 removes itself from the signaling path by returning the routing number to the CCE 112 by utilizing an SIP REDIRECT message 118. The REDIRECT message 118 contains the routing number (as well as other call setup required information). As is well known, the SIP REDIRECT message returns the required information and removes the AS 116 from the signaling path for further call setup. In an alternate embodiment, the AS 116 removes itself from the signaling path by returning the routing number to the CCE 112 by utilizing an SIP REFER message. Again, like the REDIRECT message, the REFER message would contain the routing number (as well as other call setup required information) and would remove the AS 116 from the signaling path for further call setup. Briefly, and as is well known, a REDIRECT message is a 3xx response message generated by a redirect server user agent in response to received requests. The REDIRECT message directs the requesting client to contact an alternate set of URI's. A REFER message indicates that the recipient (identified by a Request-URI) should contact another network element using contact information provided in the Request-URI.

Upon receipt of the REDIRECT message, the CCE 112 sends another INVITE message 138 to the SB 135 to determine whether further feature processing is required. The SB 135 determines that no further special processing is required, and returns a REDIRECT message 140 to the CCE 112 directing the CCE 112 to the network routing engine (NRE) 122. The CCE 112 sends an SIP INVITE 120 to the NRE 122 to determine the IP address of the appropriate BE for further routing. The NRE 122 determines the IP address of the appropriate BE using the routing information returned by the AS 116. The NRE 122 returns the requested information by message 124. It is noted that the NRE 122 is shown as a separate logical network element in the network of FIG. 1. In various embodiments, the NRE function may be implemented in the same network element as the CCE 112 or on a separate network element.

Upon receipt of the address of the appropriate BE (in this case BE 108), CCE 112 forwards INVITE message 126 to telephone 104 via BE 108. The telephone 104 accepts the call by sending an OK message 128 back to the CCE 112. The CCE 112 forwards the OK message 130 to telephone 102 via BE 106. The VoIP call between telephone 102 and telephone 104 is now set up.

It is noted that in accordance with the above described embodiment of the invention, the AS 116 removes itself from the signaling path by returning REDIRECT message 118. If the principles of the present invention were not used, then the message returned by the AS 116 could be an INVITE message instead of a REDIRECT message, in which case the AS 116 would remain in the call setup signaling path during the remainder of the call setup signaling operations. This would use additional network resources, and would increase PDD. By removing the application server from the signaling path in accordance with the principles of the invention, network resources are freed up and PDD is reduced.

Figure 3:
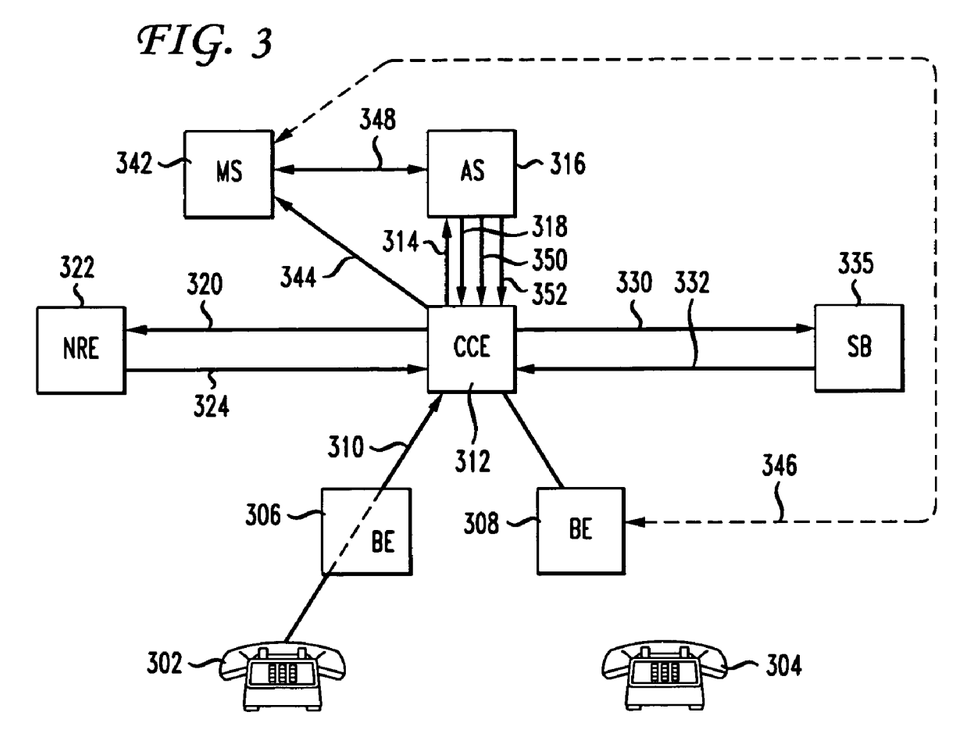
FIG. 3 shows an IP network illustrating an embodiment of the present invention.

FIG. 3 illustrates another embodiment of the present invention. Referring now to FIG. 3, in a manner similar to that described above in connection with FIG. 1, assume again that IP enabled telephone 302 wishes to initiate an IP telephony call to IP enabled telephone 304. Telephone 302 is connected to a border element (BE) 306 which provides telephone 102 access to the IP network and telephone 304 is connected to BE 308 which provides telephone 304 access to the IP network. The transaction begins by telephone 302 sending an INVITE request 310 addressed to telephone 304's Uniform Resource Identifier (URI).

The INVITE message 310 is received by CCE 312. The CCE 312 determines whether special feature processing is required by the call by sending an INVITE message 330 to service broker (SB) 335. In the present embodiment, assume that special feature processing is required to set up this call, and that the special feature processing required is that input is required from the user of telephone 302. The SB 335 determines the appropriate application server to provide the special feature processing for the call. The SB sends a REDIRECT message 332 to the CCE 312 indicating the IP address of the appropriate application server to provide the feature processing. The CCE 312 sends a query (an SIP INVITE) 314 to the application server identified by the SB 335, for example AS 316. At this point, AS 316 has been inserted into the signaling path for the call setup signaling. Again, upon the AS 316 being inserted into the signaling path for the call setup, the AS 316 performs the steps shown in FIG. 2. In this example, the AS 316 is required in the signaling path because the call requires the collection of user input in order to be setup. Therefore, control passes to step 204 in which the AS 316 executes service logic and performs the required feature processing.

In accordance with this example, the AS 316 service logic indicates that the call setup requires the services of a media server (MS) 342. The media server 342 provides the services of providing announcements and collecting information from a caller when features requiring caller interaction are required. AS 316 sends an INVITE 318 to the CCE 312. The INVITE 318 contains a uniform resource locator (URL) of a script located at the MS 342. The script identifies service logic necessary for call setup which is to be performed by MS 342.

Upon receipt of the INVITE 318, the CCE 312 sends an INVITE 320 containing the information received in message 318 to the NRE 322. The NRE 322 determines the IP address of the appropriate media server (i.e., MS 342). The NRE 322 returns the requested information by message 324.

The CCE 312 then sends an INVITE message 344 to the MS 342. The INVITE message 344 contains the URL of the script identified by the AS 316. In one embodiment, the script could identify a Voice Extensible Markup Language (VoiceXML) script. VoiceXML is a protocol designed for creating audio dialogs that feature synthesized speech, digitized audio, recognition of spoken and DTMF key input, recording of spoken input, telephony, and mixed initiative conversations. VoiceXML is one type of script which may be executed by the MS 342, and the details of such a script are not required for an understanding of the present invention.

Upon receipt of the INVITE message 344, the MS 342 executes the script identified by the URL in the INVITE message 344. The MS 342 may now play certain voice announcements directly to the telephone 304 via BE 308 using the early media protocol as represented by 346 which is a real time transport protocol (RTP) connection. Early media protocol is a protocol for exchanging media (e.g., audio) prior to a call being setup. Early media is well known, the details of which are not required for an understanding of the present invention. The MS 342 then plays an appropriate announcement to telephone 304. In the example being discussed, it will be assumed that the announcement is a request for the user of telephone 304 to enter some information (e.g., an account number) using the telephone keypad. The MS 342 collects the entered information, and when the user input is complete, the MS 342 sends the collected information to the AS 316 via connection 348, which is a hypertext transfer protocol (HTTP) connection as is well known in the art.

Upon receipt of the information from the MS 342, the AS 316 validates the information, and if the information is validated, the AS 316 determines that call setup may proceed. Referring again to FIG. 2, the processing up to this point is represented by step 204, during which the AS 316 has been providing feature processing. It is at this point in the processing (i.e., after collection and validation of user input) that AS 316 determines that it is no longer required in the signaling path (step 202) and in step 206 the AS 316 removes itself from the signaling path as follows. AS 316 cancels the INVITE message 318 using the SIP CANCEL message 350. After canceling the INVITE, AS 316 then issues an SIP REDIRECT message 352 which redirects the initial INVITE message 314. Thus, AS 316 is removed from the signaling path for further call setup. In an alternate embodiment, the AS 316 removes itself from the signaling path by utilizing an SIP REFER message.

Figure 4:
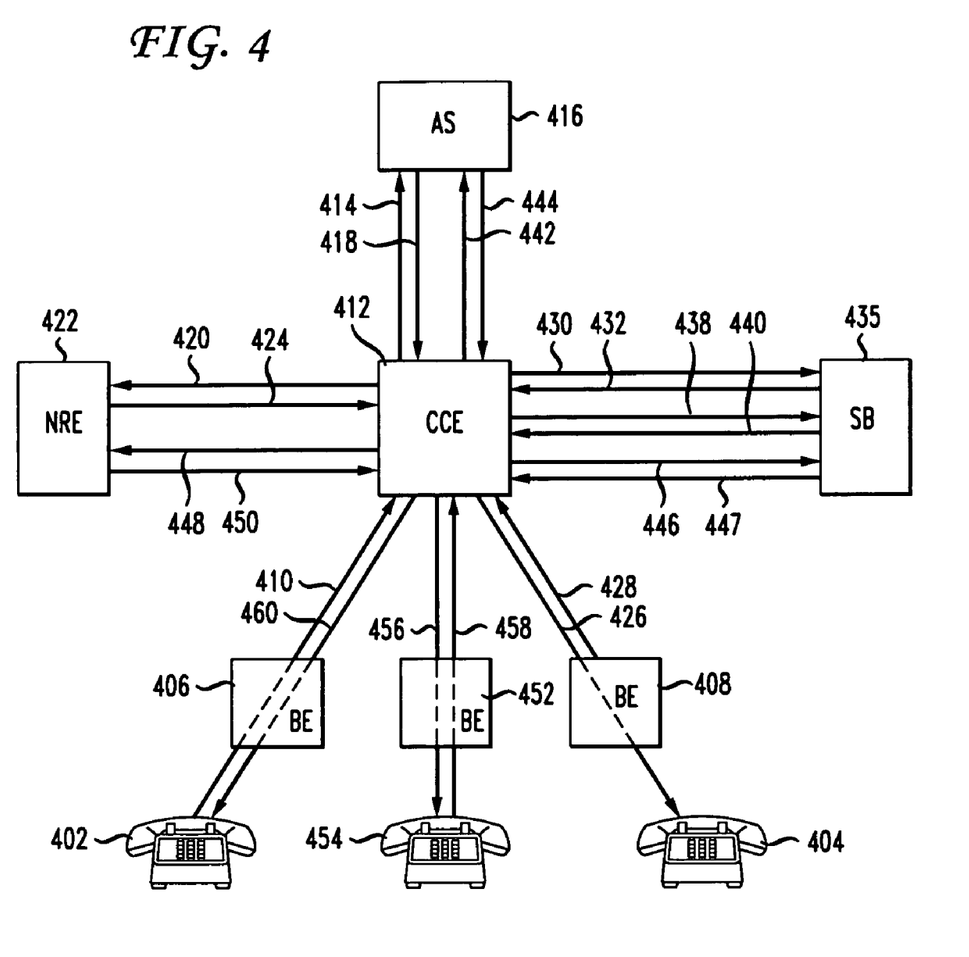
FIG. 4 shows an IP network illustrating an embodiment of the present invention.

FIG. 4 shows another signaling situation in which the principles of the present invention may be implemented. Referring now to FIG. 4, in a manner similar to that described above in connection with FIG. 1, assume again that IP enabled telephone 402 wishes to initiate an IP telephony call to IP enabled telephone 404. Telephone 402 is connected to a border element (BE) 406 which provides telephone 402 access to the IP network and telephone 404 is connected to BE 408 which provides telephone 404 access to the IP network. The transaction begins by telephone 402 sending an INVITE request 410 addressed to telephone 404's Uniform Resource Identifier (URI).

The INVITE message 410 is received by CCE 412. The CCE 412 determines whether special feature processing is required by the call by sending an INVITE message 430 to SB 435. In the present embodiment, assume that special processing is required to set up this call, and that the special feature processing required is that the call is eligible for special "overflow to an alternate number on egress busy" treatment. That is, if the initial egress point of the call is busy, the call may be transferred to another egress point. The SB 435 determines the appropriate application server to provide the special feature processing for the call. The SB sends a REDIRECT message 432 to the CCE 412 indicating the IP address of the appropriate application server to provide the feature processing. The CCE 412 sends a query (an SIP INVITE) 414 to the application server identified by the SB 435, for example AS 416. At this point, AS 416 has been inserted into the signaling path for the call setup. Again, upon the AS 416 being inserted into the signaling path for the call setup, the AS 416 performs the steps shown in FIG. 2. In this example, the AS 416 is required in the signaling path because the call may require the treatment in order to be setup. Therefore, control passes to step 204 in which the AS 416 executes service logic and performs the required feature processing.

In accordance with this example, the AS 416 service logic indicates that the call setup may require overflow treatment and therefore AS 416 must remain in the signaling path. Thus, AS 416 sends an INVITE 418 to the CCE 412. The INVITE 418 contains the primary routing number for the call. Upon receipt of the INVITE 418, the CCE 412 sends another INVITE message 438 to the SB 435 to determine whether further special processing is required. Now, the SB 435 will determine that no further special processing is required, and returns a REDIRECT message 440 to the CCE 412 directing the CCE 412 to the NRE 422. The CCE 412 sends an SIP INVITE 420 to the NRE 422 to determine the IP address of the appropriate BE for further routing. The NRE 422 determines the IP address of the appropriate BE using the routing information returned by the AS 416. The NRE 422 returns the requested information by message 424.

Upon receipt of the address of the appropriate BE (in this case BE 408), CCE 412 forwards INVITE message 426 to telephone 404 via BE 408. In accordance with the particular example of FIG. 4, assume that BE 408 returns a busy message 428 (e.g., "SIP 486 User Busy") to the CCE 412. This message 428 indicates that BE 408 cannot accept the call. The CCE 412 then forwards this busy message 428 to the AS 416 as message 442. It is noted that the AS 416 is still in the call signaling path because it determined in step 202 (FIG. 2) that it was still required in the signal path because overflow processing may be necessary.

Upon receipt of message 442, AS 416 (in step 204), based on the service logic for this call, determines an alternate routing number associate with the call. After determining the alternate routing number, AS 416 determines in step 202 that it is no longer required in the signaling path because it has provided the overflow treatment processing. Since no further overflow processing may be performed with respect to this call, the AS 416 may remove itself from the signaling path in accordance with the principles of the present invention. Thus, AS 416 removes itself from the signaling path by returning the alternate number to the CCE 412 utilizing an "SIP 302 Moved Temporarily" message 444. This SIP message removes AS 416 from the signaling path.

Upon receipt of the "SIP 302 Moved Temporarily" message 444, the CCE 412 will send another INVITE message 446 to the SB 435 to determine whether further special feature processing is required. The SB 435 determines that no further special feature processing is required, and returns a REDIRECT message 447 to the CCE 412 directing the CCE 412 to the NRE 422. The CCE 412 sends an SIP INVITE 448 to the NRE 422 to determine the IP address of the appropriate border element for further routing. The NRE 422 determines the IP address of the appropriate border element using the routing information returned by the AS 416 in message 444. The NRE 422 returns the requested information by INVITE message 450. Upon receipt of the address of the appropriate alternate BE (in this case BE 452), CCE 412 forwards the INVITE message 456 to telephone 454 via BE 452. The telephone 454 accepts the call by sending an OK message 458 back to the CCE 412. The CCE 412 forwards the OK message 460 to telephone 402 via BE 406. The VoIP call between telephone 402 and alternate overflow telephone 454 is now set up.

Figure 5:
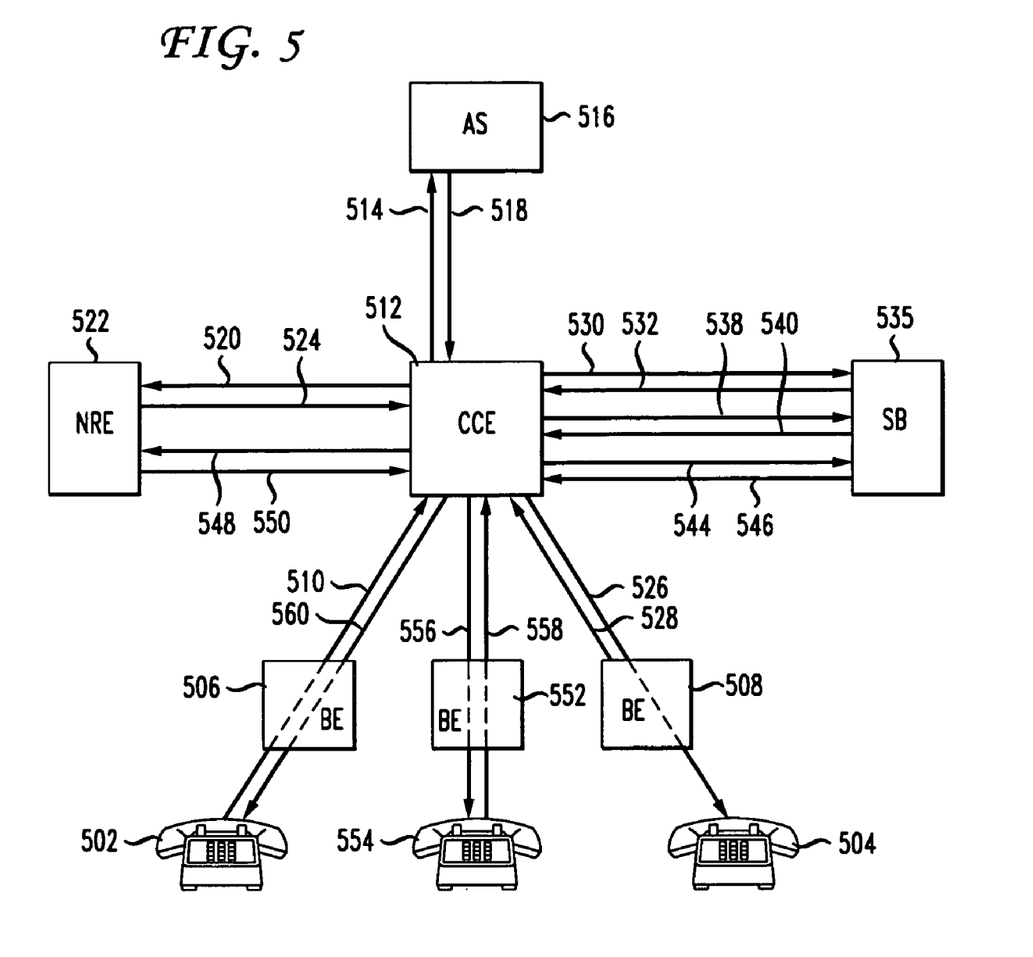
FIG. 5 shows an IP network illustrating an embodiment of the present invention.

FIG. 5 shows yet another signaling situation in which the principles of the present invention may be implemented. Referring now to FIG. 5, in a manner similar to that described above in connection with FIG. 1, assume again that IP enabled telephone 502 wishes to initiate an IP telephony call to IP enabled telephone 504. Telephone 502 is connected to BE 506 which provides telephone 502 access to the IP network and telephone 504 is connected to BE 508 which provides telephone 504 access to the IP network. The transaction begins by telephone 502 sending an INVITE request 510 addressed to telephone 504's Uniform Resource Identifier (URI).

The INVITE message 510 is received by CCE 512. The CCE 512 determines whether special feature processing is required by the call by sending an INVITE message 530 to SB 535. In the present embodiment, assume that special feature processing is required to set up this call, and again that the special feature processing required is that the call is eligible for special "overflow to an alternate number on egress busy" treatment. The SB 535 determines the appropriate application server to provide the special feature processing for the call. The SB 535 sends a REDIRECT message 532 to the CCE 512 indicating the IP address of the appropriate application server to provide the feature processing. The CCE 512 sends a query (an SIP INVITE) 514 to the application server identified by the SB 535, for example AS 516. At this point, AS 516 has been inserted into the signaling path for the call setup. Again, upon the AS 516 being inserted into the signaling path for the call setup, the AS 516 performs the steps shown in FIG. 2. In this example, the AS 516 is again required in the signaling path because the call may require overflow treatment in order to be setup. Therefore, control passes to step 204 in which the AS 516 executes service logic and performs the required feature processing.

In accordance with this example, the AS 516 service logic indicates that the call setup may require overflow treatment. Unlike the embodiment described above in connection with FIG. 4, here the AS 516 provides both the primary routing number as well as the alternate routing number for the call to the CCE 512. Therefore, the AS 516 makes the determination (in step 202) that it is no longer required in the signaling path, and removes itself from the signaling path in step 206. The AS 516 removes itself from the signaling path by providing the primary and alternate routing number to the CCE 512 utilizing an SIP REDIRECT message (e.g., SIP 3XX) 518.

Upon receipt of the REDIRECT message 518, the CCE 512 sends another INVITE message 538 to the SB 535 to determine whether further special processing is required. Now, the SB 535 determines that no further special processing is required, and returns a REDIRECT message 540 to the CCE 512 directing the CCE 512 to the NRE 522. The CCE 512 sends an SIP INVITE 520 to the NRE 522 to determine the IP address of the appropriate border element for routing. The NRE 522 determines the IP address of the appropriate border element using the primary routing information returned by the AS 516. The NRE 522 returns the requested information by message 524.

Upon receipt of the address of the appropriate border element (in this case BE 508), CCE 512 forwards INVITE message 526 to telephone 504 via BE 508. In accordance with the particular example of FIG. 5, assume that BE 508 returns a busy message 528 (e.g., "SIP 486 User Busy") to the CCE 512. This indicates that BE 508 cannot accept the call. The CCE 512 already has the alternate routing number and the CCE 512 sends another INVITE message 544 to the SB 535 to determine whether further special processing is required. The SB 535 will determine that no further special processing is required, and returns a REDIRECT message 546 to the CCE 512 directing the CCE 512 to the NRE 522. The CCE 512 sends an SIP INVITE 548 to the NRE 522 to determine the IP address of the appropriate border element for further routing. The NRE 522 determines the IP address of the appropriate border element using the alternate routing information. The NRE 522 returns the requested information by INVITE message 550. Upon receipt of the address of the appropriate alternate border element (in this case BE 552), CCE 512 forwards the INVITE message 556 to telephone 554 via BE 552. The telephone 554 accepts the call by sending an OK message 558 back to the CCE 512. The CCE 512 forwards the OK message 560 to telephone 502 via BE 506. The VoIP call between telephone 502 and alternate overflow telephone 554 is now set up.

As may be seen from the above description, the present invention provides for an application server to remove itself from the signaling path upon a determination that it no longer needs to remain in the signaling path. This frees up network resources and reduces PDD. Several particular embodiments have been described above in which an application server may appropriately determine that it is no longer required in the signaling path and thus remove itself from the signaling path. It would be readily apparent to one skilled in the art that there are many other situations in which the principles of the present invention may be applied.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, there are many other situations, in addition to those described herein, in which an application server may determine that it is no longer required in the signaling path and may therefore remove itself from the signaling path.

The invention claimed is:

1. A signaling method for use in setting up internet protocol network calls, said method comprising the steps of:
   receiving at an application server in an internet protocol network call information whereby said application server is inserted into a signaling path for said call, the application server for providing call feature processing;
   providing call feature processing including determining a primary and alternate routing number for said call;
   determining, at said application server, whether said application server is required in the signaling path to complete call setup for said call; and
   if said application server is not required in the signaling path to complete said call setup, said application server removing itself from the signaling path;
   wherein said step of providing said call feature processing further comprises the step of sending an SIP INVITE message to a call control element in order to invoke service of another network server, said SIP INVITE message containing a URL of a script identified by the application server; and
   wherein said step of said application server removing itself from the call signaling path further comprises the steps of sending to said call control element a) an SIP redirect message or SIP REFER message, and b) an SIP cancel to cancel said INVITE message.

2. The method of claim 1 wherein said step of said application server removing itself from the call signaling path further comprises the step of:
   transmitting an SIP REDIRECT message to a call control element.

3. The method of claim 1 wherein said step of said application server removing itself from the call signaling path further comprises the step of:
   transmitting an SIP REFER message to a call control element.

4. The method of claim 1 wherein, if said determining step determines that said application server is required in said signaling path to complete call setup, said method further comprising the steps of:
   said application server providing feature processing for said call; and
   said application server thereafter determining that it is not required in said signaling path to complete call setup and removing itself from the call signaling path.

5. The method of claim 1 wherein said another network server is a media server and wherein said invoked service is collection of caller input.

6. The method of claim 1 wherein said step of removing occurs prior to completion of call setup.

7. A signaling method for use in setting up internet protocol network calls, said method comprising the steps of:
   receiving at an application server in an internet protocol network a request for call feature processing for a call whereby said request inserts said application server in a signaling path for call setup, the application server for providing call feature processing;
   providing by said application server said call feature processing including determining a primary and alternate routing number for said call; and
   removing by said application server itself from said signaling path upon a determination that it is no longer required in said signaling path for call setup;
   wherein said step of providing by said application server said call feature processing further comprises the step of sending an SIP INVITE message to a call control element in order to invoke service of another network server, said SIP INVITE message containing a URL of a script identified by the application server; and
   wherein said step of said application server removing itself from the call signaling path further comprises the steps of sending to said call control element a) an SIP redirect message or SIP REFER message, and b) an SIP cancel to cancel said INVITE message.

8. The method of claim 7 wherein said step of removing occurs prior to completion of call setup.

9. The method of claim 7 wherein said step of removing occurs immediately subsequent to said determining step.

10. The method of claim 7 wherein said step of providing said call feature processing further comprises the steps of:
  sending said primary routing number to a network element; and
  receiving an indication for the alternate routing number.

11. The method of claim 10 wherein said step of removing occurs immediately subsequent to said step of determining said alternate routing number.

12. A network node for providing call feature processing, said network node comprising of:
  means for receiving call information;
  means for providing call feature processing during setup of internet protocol network calls, the call feature processing including determining a primary and alternate routing number for said call;
  means for determining whether said network node is required in a signaling path to complete call setup for said call; and
  means for said network node removing itself from the signaling path if is not required in the signaling path to complete said call setup;
  wherein said means for providing said call feature processing further comprises means for sending an SIP INVITE message to a call control element in order to invoke service of a network server, said SIP INVITE message containing a URL of a script identified by an application server; and
  wherein said means for said network node removing itself from the call signaling path further comprises the steps of sending to said call control element a) an SIP redirect message or SIP REFER message, and b) an SIP cancel to cancel said INVITE message.

13. The network node of claim 12 wherein said means for removing further comprises:
  means for transmitting an SIP redirect message to a call control element.

14. The network node of claim 12 wherein means for removing further comprises:
  means for transmitting an SIP REFER message to a call control element.

15. The method of claim 1 wherein:
  the call control element sends another SIP INVITE message to the other network server; and
  the other network server determines the IP address of the alternate routing number.

* * * * *